H. DE W. HILDRETH.
COMBINED SHIRT AND COLLAR FASTENING DEVICE.
APPLICATION FILED JAN. 23, 1911.
1,027,603.
Patented May 28, 1912.
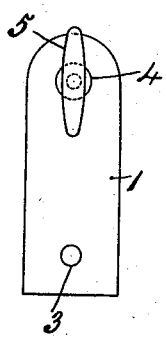
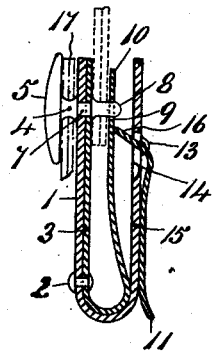
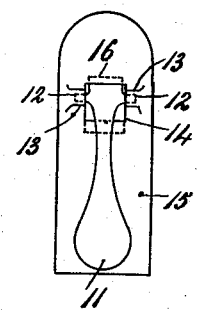
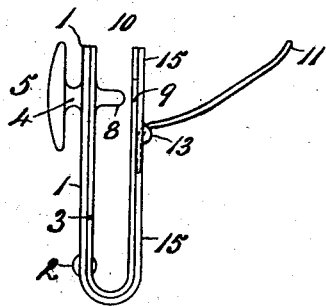

UNITED STATES PATENT OFFICE.

HIRAM DE WITT HILDRETH, OF HAMILTON, ONTARIO, CANADA.

COMBINED SHIRT AND COLLAR FASTENING DEVICE.

1,027,603. Specification of Letters Patent. Patented May 28, 1912.

Application filed January 23, 1911. Serial No. 604,242.

*To all whom it may concern:*

Be it known that I, HIRAM DE WITT HILDRETH, of 110 Ontario avenue, in the city of Hamilton, in the county of Wentworth, in the Province of Ontario, Dominion of Canada, have invented a new and useful Combined Shirt and Collar Fastening Device, of which the following is a specification.

This invention relates to a combined shirt and collar fastening device and it is more particularly applicable for securing the collar band opening folds and collar ends together.

The object of my invention is to provide a simple, cheap and effective means whereby a shirt collar band and collar may be securely fastened together without fear of injury to the finger nails or the employment of a buttoning or stud adjusting device.

The invention consists essentially of a U-shaped clip which is furnished at the rear of one of its limbs with a stud attachment for attachment to the collar band and on the inner face thereof with a projection and spring controlled clip for securing the collar folds together.

In the accompanying drawings Figure 1, is a back view—drawn to an enlarged scale for the sake of clearness—of the improved shirt and collar fastening device. Fig. 2, is a section on the line a—a, in Fig. 1, Fig. 3, is a front view of the device, and Fig. 4, is an edge view showing the spring clip released.

According to my invention I take a strip of suitable metal and bend or fold it upon itself to constitute a U-shaped piece as will be clearly comprehended from Fig. 2. To one of the limbs, 1, of this U-shaped piece and inside thereof I secure by a rivet 2, a flat spring 3, which is of approximately the same dimensions as said U-shaped piece.

To the limb 1, and at the rear and upper part thereof I attach by screwing, riveting or otherwise a stud attachment consisting of a neck piece 4, and an elongated narrow head 5, which is readily adapted for passage through the button-holes of a shirt collar band. The shank 7, of this stud attachment is extended through the spring 2, and riveted down to form a projection or pintle 8, which is adapted for coöperation with or insertion through a hole 9, provided for the purpose in the free limb 10, of the aforesaid flat spring 2, as hereafter explained.

11, is a finger lever of the well known type, mounted by lateral projections 12, engaging in stamped up bearings 13, provided for their reception at the sides of a slot 14, in the front limb 15, of the U-shaped piece, and 16, is an inclined extension of said finger lever for coöperating with the free limb 10, of the flat spring above described.

In use, the wearer, inserts the stud attachment through the button holes of the shirt collar band,—indicated by the dot-and-dash lines 17, in Fig. 2,—by holding the device horizontally so that the elongated head 5, is in line with the holes when a slight pressure will force it therethrough whereupon the device is turned down vertically so that the said head 5, lies across the said button holes and the shirt folds are securely fastened together. The finger lever 11, is then raised to the position shown by Fig. 4, when the free portion 10, of the flat spring lies flat against the inner face of the limb 15, and the collar ends may be passed into the device and the pintle 8, inserted into the stud holes therein. When this operation is complete the wearer folds down the finger lever 11, to the position shown by Fig. 2, whereupon the pintle 8, is caused to enter the hole 9, in the part 10, of the spring by the inclined extension 16, forcing said spring away from the limb 15, as will be clearly understood on an examination of the drawings.

From the foregoing it will be readily seen that by my invention I provide a very simple and effective device for the purpose specified which may be readily and cheaply produced from any desired metal by stamping and I do not limit myself to the pattern or configuration of the U-shaped part as that may obviously have any appropriate and artistic outline.

What I claim and desire to secure by Letters Patent is:—

In a shirt and collar fastening device, the combination of a U-shaped piece of material, a similarly outlined piece of springy material fitted therein one leg of which is secured to one limb of the first named U-shaped piece, by means of a rivet the other leg of said piece being free to move toward the first named leg, a stud attachment fixed to the rear upper end of the same limb as the spring is secured said stud attachment being provided with an elongated head extending longitudinally of the U-shaped piece and having its shank extended through the limb and spring to constitute a pintle for engagement in a hole provided for its reception in the free end of the aforesaid spring, and a finger lever pivoted within a slot in the opposite limb of the U-shaped piece and provided with an inclined extension for coöperating with the free end of the aforesaid spring, substantially as shown for the purpose specified.

Signed in the presence of the subscribing witnesses at Hamilton, Ontario, in the Dominion of Canada, the 18th day of January, 1911.

HIRAM DE WITT HILDRETH.

Witnesses:
ALFRED T. BRATTON,
GERTIE NICHOLSON.

Copies of this patent may be obtained for five cents each, by addressing the "Commissioner of Patents, Washington, D. C."